United States Patent
Do et al.

(10) Patent No.: US 7,864,149 B2
(45) Date of Patent: Jan. 4, 2011

(54) DISPLAY PANEL

(75) Inventors: Hee-Wook Do, Suwon-si (KR);
Byoung-Sun Na, Suwon-si (KR);
Seung-Hoo Yoo, Seongnam-si (KR);
Soon-Il Ahn, Cheonan-si (KR);
Hyun-Cheol Moon, Seoul (KR);
Hye-Ran You, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 582 days.

(21) Appl. No.: 11/845,285

(22) Filed: Aug. 27, 2007

(65) Prior Publication Data
US 2008/0055292 A1   Mar. 6, 2008

(30) Foreign Application Priority Data
Aug. 29, 2006   (KR) .................... 10-2006-0082387

(51) Int. Cl.
*G09G 3/36* (2006.01)
(52) U.S. Cl. ..................... 345/92; 345/90; 345/100; 345/87
(58) Field of Classification Search ........... 345/87–100, 345/690, 204, 211
See application file for complete search history.

(56) References Cited

U.S. PATENT DOCUMENTS

| | | | | |
|---|---|---|---|---|
| 6,724,359 B2 * | 4/2004 | Yamamoto et al. | ............ | 345/92 |
| 7,034,789 B2 * | 4/2006 | Takeuchi et al. | ............. | 345/90 |
| 7,199,808 B2 * | 4/2007 | Yo | ............... | 345/694 |
| 7,595,781 B2 * | 9/2009 | Takeuchi et al. | ............. | 345/90 |
| 7,633,481 B2 * | 12/2009 | Kim et al. | .................. | 345/99 |
| 2006/0028589 A1 | 2/2006 | Um et al. | | |

FOREIGN PATENT DOCUMENTS

| | | |
|---|---|---|
| JP | 09-113933 | 5/1997 |
| JP | 2004-078157 | 3/2004 |
| JP | 2006-048055 | 2/2006 |
| KR | 1020040002600 | 1/2004 |
| KR | 1020060012761 | 2/2006 |

\* cited by examiner

*Primary Examiner*—Duc Q Dinh
(74) *Attorney, Agent, or Firm*—H.C. Park & Associates, PLC

(57) ABSTRACT

In a display panel, main and sub pixel electrodes are connected to first and second drain electrodes of a thin film transistor, respectively, to receive a data voltage during a 1 H period as main and sub pixel voltages. A main storage electrode overlaps the main pixel electrode to receive a first common voltage that varies with the gate pulse and the polarity of the data voltage. A sub storage electrode overlaps the sub pixel electrode to receive a second common voltage that is uniformly maintained at a constant voltage level. The sub pixel voltage is uniformly maintained by the second common voltage, but the main pixel voltage is shifted up or down by the first common voltage. Thus, the main pixel voltage may have a voltage level higher than that of the sub pixel voltage.

16 Claims, 10 Drawing Sheets

DISPLAY PANEL

CROSS-REFERENCE TO RELATED APPLICATION

This application claims priority from and the benefit of Korean Patent Application No. 10-2006-0082387, filed on Aug. 29, 2006, which is hereby incorporated by reference for all purposes as if fully set forth herein.

BACKGROUND OF THE INVENTION

1. Field of the Invention

The present invention relates to a display panel. More particularly, the present invention relates to a display panel that may have enhanced brightness and improved side viewing visibility.

2. Discussion of the Background

In order to improve the viewing angle of liquid crystal displays (LCDs), patterned vertical alignment (PVA) mode LCDs, multi-domain vertical alignment (MVA) mode LCDs, and super-patterned vertical alignment (S-PVA) mode LCDs have been researched and developed, all of which have wide viewing-angles.

An S-PVA mode LCD may be categorized as a coupling-capacitor (CC) type or a two-transistor (TT) type in accordance with the driving method thereof. The CC type LCD includes a main pixel electrode, a sub pixel electrode, and a coupling capacitor formed between the main and sub pixel electrodes to drop the voltage applied to the sub pixel electrode and to apply the dropped voltage to the sub pixel electrode as a sub pixel voltage, which is lower than the voltage applied to the main pixel electrode. Thus, in the case of the CC type driving method, the level of the sub pixel voltage is lowered at a high gray-scale, thereby deteriorating the brightness of the S-PVA mode LCD.

The TT type driving method applies main and sub pixel voltages having different voltage levels to the main and sub pixel electrodes, respectively, using two transistors that are turned on at different times. However, in order to drive the two transistors at different times, the TT type driving method requires a driving frequency that is twice the driving frequency used in the CC type driving method, thereby increasing power consumption.

SUMMARY OF THE INVENTION

The present invention provides a display panel that may have enhanced brightness and improved side viewing visibility.

Additional features of the invention will be set forth in the description which follows, and in part will be apparent from the description, or may be learned by practice of the invention.

The present invention discloses a display panel including a plurality of pixels. Each pixel includes a gate line, a data line, a main storage electrode, a sub storage electrode, a main pixel electrode, a sub pixel electrode, a first thin film transistor, and a second thin film transistor. The gate line receives a gate pulse that is maintained at a gate-on voltage during a 1 H period. The data line is insulated from and crosses the gate line to receive a data voltage. The main storage electrode receives a first common voltage that varies with the gate pulse and the polarity of the data voltage, and the sub storage electrode receives a second common voltage that is maintained at a constant voltage level. The main pixel electrode is capacitively coupled to the main storage electrode, and the sub pixel electrode is capacitively coupled to the sub storage electrode. The first thin film transistor is connected to the gate line, the data line, and the main pixel electrode, and the second thin film transistor is connected to the gate line, the data line, and the sub pixel electrode. The main pixel electrode receives the data voltage from the first thin film transistor during the 1 H period and then its voltage is changed into a main pixel voltage different from the data voltage in response to a variation of the first common voltage. The sub pixel electrode receives the data voltage from the second thin film transistor during the 1 H period and then its voltage is maintained as a sub pixel voltage until it receives the next data voltage from the second thin film transistor.

The present invention also discloses a display panel including a plurality of pixels. Each pixel includes a gate line, a data line, a main storage electrode, a main pixel electrode, a sub pixel electrode, a first thin film transistor, and a second thin film transistor. The gate line receives a gate pulse that is maintained at a gate-on voltage during a 1 H period. The data line is insulated from and crosses the gate line to receive a data voltage. The main storage electrode receives a common voltage that varies with the gate pulse and the polarity of the data voltage. The main pixel electrode is capacitively coupled to the main storage electrode. The main pixel electrode receives the data voltage from the first thin film transistor during the 1 H period and then its voltage is changed into a main pixel voltage different from the data voltage in response to a variation of the common voltage. The sub pixel electrode receives the data voltage from the second thin film transistor during the 1 H period and then its voltage is maintained as a sub pixel voltage until it receives the next data voltage from the second thin film transistor. The common voltage has a period corresponding to two frames and swings between a first voltage that is lower than a predetermined reference voltage and a second voltage that is higher than the reference voltage.

The present invention also discloses a method of driving an LCD panel including applying a data voltage to a main pixel electrode from a first thin film transistor during a 1 H period, changing the voltage of the main pixel electrode to a main pixel voltage different from the data voltage in response to a variation of a first common voltage, applying the data voltage to a sub pixel electrode from a second thin film transistor during the 1 H period, and maintaining the voltage of the sub pixel electrode until it receives a next data voltage from the second thin film transistor. The first common voltage varies with a gate pulse and a polarity of the data voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of the present invention will be explained in detail with reference to the accompanying drawings.

Figure 1:
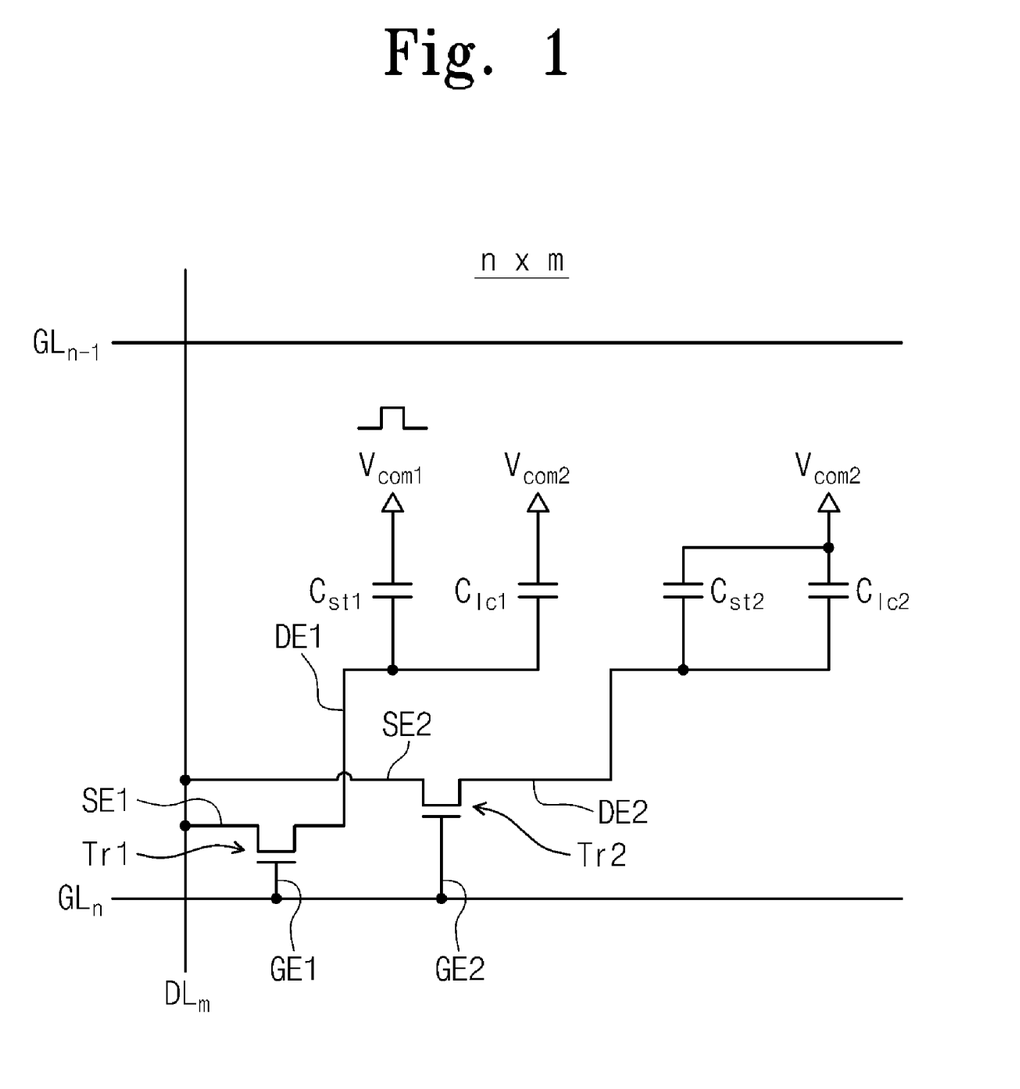
FIG. 1 is an equivalent circuit diagram of the (n,m)th pixel among pixels arranged on a display panel according to an exemplary embodiment of the present invention.
Figure 2:
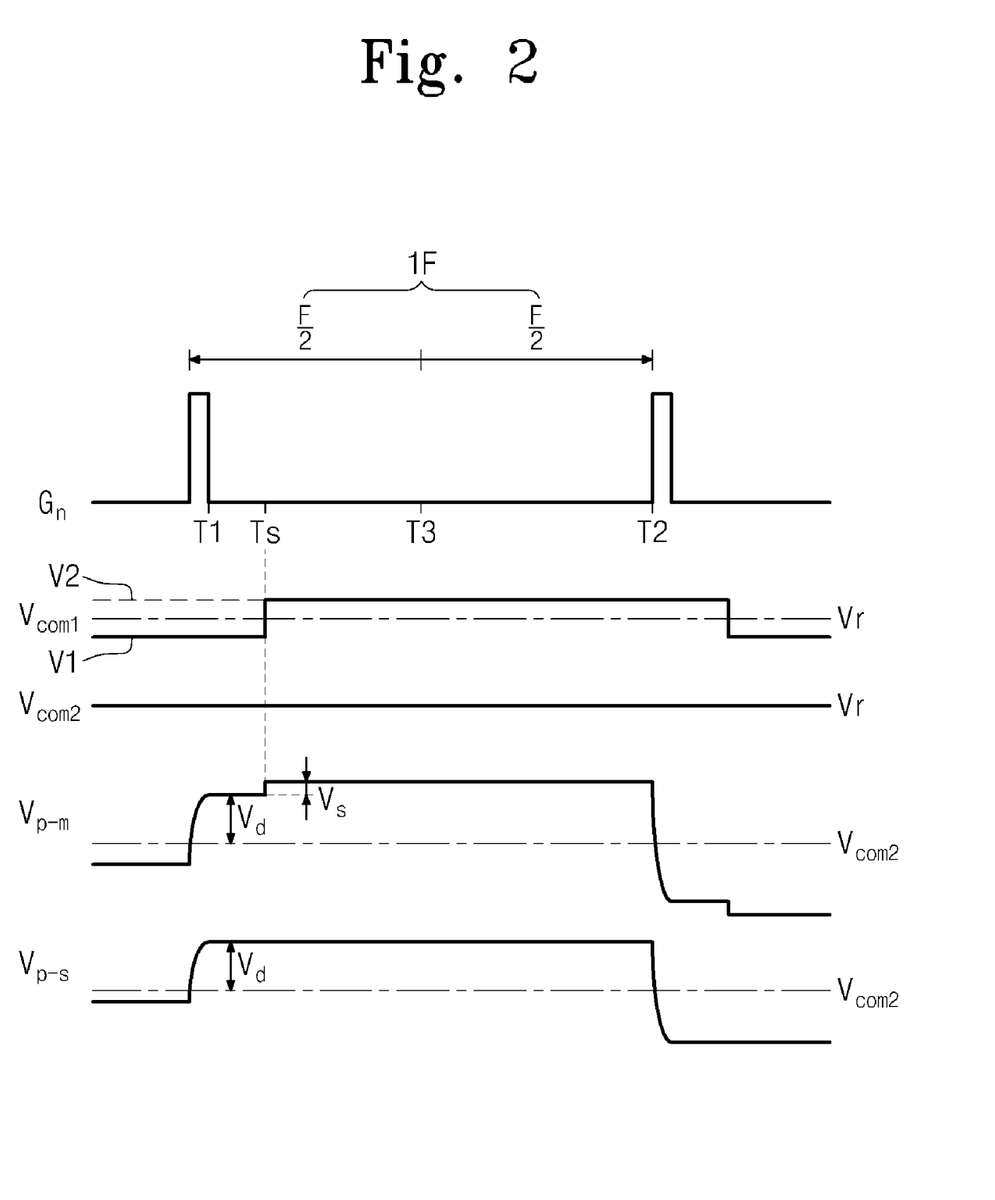
FIG. 2 is a waveform diagram showing various signals applied to the equivalent circuit diagram of FIG. 1.

FIG. 1 is an equivalent circuit diagram of the (n,m)th pixel among pixels arranged on a display panel according to an exemplary embodiment of the present invention, and FIG. 2 is a waveform diagram showing various signals applied to the equivalent circuit diagram of FIG. 1.

Referring to FIG. 1 and FIG. 2, the (n,m)th pixel includes an n-th gate line $GL_n$, an m-th data line $DL_m$, a first thin film transistor Tr1, and a second thin film transistor Tr2. Each of the first and second thin film transistors Tr1, Tr2 is connected to the n-th gate line $GL_n$ and the m-th data line $DL_m$. Particularly, the first thin film transistor Tr1 includes a first gate electrode GE1 connected to the n-th gate line $GL_n$, a first source electrode SE1 connected to the m-th data line $DL_m$, and a first drain electrodes DE1. The second thin film transistor Tr2 includes a second gate electrode GE2 connected to the n-th gate line $GL_n$, a second source electrode SE2 connected to the m-th data line $DL_m$, and a second drain electrodes DE2.

The n-th gate line $GL_n$ and the m-th data line $DL_m$ receive a gate pulse $G_n$ and a data voltage $V_d$, respectively. The gate pulse $G_n$ is maintained at a gate-on voltage during a 1 H period (one horizontal scanning period). When the first and second thin film transistors Tr1, Tr2 are turned on during the 1 H period in response to the gate pulse $G_n$, the data voltage $V_d$ applied to the first and second source electrodes SE1, SE2 are output to the first and second drain electrodes DE1 and DE2, respectively. After the 1 H period, the first and second thin film transistors Tr1, T2 are turned off and the first and second drain electrodes DE1 and DE2 are disconnected from each other.

The (n,m)th pixel further includes a main pixel and a sub pixel. The main pixel is connected to the first drain electrode DE1 of the first thin film transistor Tr1, and the sub pixel is connected to the second drain electrode DE2 of the second thin film transistor Tr2.

The main pixel includes a first storage capacitor $C_{st1}$ and a first liquid crystal capacitor $C_{lc1}$. The first storage capacitor $C_{st1}$ is defined by a main storage electrode, an insulating layer, and a main pixel electrode, and the first liquid crystal capacitor $C_{lc1}$ is defined by the main pixel electrode, a liquid crystal layer, and a common electrode.

The main storage electrode receives a first common voltage $V_{com1}$ that is an alternating current voltage, the main pixel electrode receives the data voltage $V_d$ during the 1 H period, and the common electrode receives a second common voltage $VC_{com2}$ that is a direct current voltage.

The first common voltage $V_{com1}$ is an alternating current voltage swung between a second voltage V2 higher than a reference voltage $V_r$ and a first voltage V1 lower than the reference voltage $V_r$, and one period of the first common voltage $V_{com1}$ is equal to two frames. In the present exemplary embodiment, the second common voltage $V_{com2}$ is maintained at the reference voltage $V_r$.

The first common voltage $V_{com1}$ depends on the time at which the gate pulse $G_n$ is generated and the polarity of the data voltage $V_d$. The voltage level of the first common voltage $V_{com1}$ is shifted after a predetermined time interval when the gate pulse $G_n$ is generated. The shifting time Ts of the first common voltage $V_{com1}$ is between a first time T1 at which the gate pulse $G_n$ is lowered from the gate-on voltage to a gate-off voltage and a second time T2 that is later than the first time T1 by one frame. As an example of the present exemplary embodiment, the shifting time Ts is between the first time T1 and a third time T3 that is later than the first time T1 by half a frame.

Meanwhile, the voltage level of the first common voltage $V_{com1}$ is shifted up or shifted down in accordance with the polarity of the data voltage $V_d$. Particularly, when the data voltage $V_d$ has positive polarity with respect to the second common voltage $V_{com2}$, the first common voltage $V_{com}1$ is shifted up to the second voltage V2 from the first voltage V1. On the contrary, when the data voltage $V_d$ has negative polarity with respect to the second common voltage $V_{com2}$, the first common voltage $V_{com1}$ is shifted down to the first voltage V1 from the second voltage V2.

When the gate pulse $G_n$ is generated during the 1 H period, the data voltage $V_d$ is charged into the first and second liquid crystal capacitors $C_{lc1}$ and $C_{lc2}$ as a main pixel voltage $V_{p-m}$ and a sub pixel voltage $V_{p-s}$, respectively. Assuming that the data voltage $V_d$ has positive polarity, the first common voltage $V_{com1}$ is shifted up at the shifting time Ts. When the voltage level of the first common voltage $V_{com1}$ applied to the main storage electrode is shifted up, the main pixel voltage $V_{p-m}$ charged into the first liquid crystal capacitor $C_{lc1}$ increases by the shifted voltage $V_s$. Thus, the main pixel voltage $V_{p-m}$ charged into the first liquid crystal capacitor $C_{lc1}$ has a higher voltage level than that of the sub pixel voltage $V_{p-s}$ charged into the second liquid crystal capacitor $C_{lc2}$ after the shifting time Ts. In the present exemplary embodiment, the shifted voltage $V_s$ may have a voltage level within the range of about 1 volt to about 2 volts.

After the second time T2, assuming that the data voltage $V_d$ has negative polarity, the first common voltage $V_{com1}$ is shifted down at the shifting time Ts. Thus, when the voltage level of the first common voltage $V_{com1}$ applied to the main storage electrode decreases, the main pixel voltage $V_{p-m}$ charged into the first liquid crystal capacitor $C_{lc1}$ decreases by the shifted voltage $V_s$. Thus, the main pixel voltage $V_{p-m}$ charged into the first liquid crystal capacitor $C_{lc1}$ has a lower voltage level than that of the sub pixel voltage $V_{p-s}$ charged into the second liquid crystal capacitor $C_{lc2}$ after the shifting time Ts.

The main pixel voltage satisfies the following equation:

$$V_{p-m} = V_d + \frac{C_{st1}}{C_{st1} + C_{gs1} + C_{lc1}} V_s$$

In the equation, $V_{p-m}$, $V_d$, $C_{st1}$, $C_{lc1}$, $C_{gs1}$, and $V_s$ indicate the main pixel voltage, the data voltage, the first storage capacitor, the first liquid crystal capacitor, a parasitic capacitor between the first drain electrode and the source electrode of the thin film transistor, and the shifted voltage, respectively.

As represented by the equation, the main pixel voltage $V_{p-m}$ has a voltage level that is higher or lower than the data voltage $V_d$ by the shifted voltage $V_s$. Also, in accordance with the equation, the variation in the main pixel voltage $V_{p-m}$ due to the shifted voltage $V_s$ increases when the capacitances of the first liquid crystal capacitor $C_{lc1}$ and the parasitic capacitor $C_{gs1}$ decrease. On the contrary, the variation in the main pixel voltage $V_{p-m}$ due to the shifted voltage $V_s$ decreases when the capacitances of the first liquid crystal capacitor $C_{lc1}$ and the parasitic capacitor $C_{gs1}$ increase.

Figure 3:
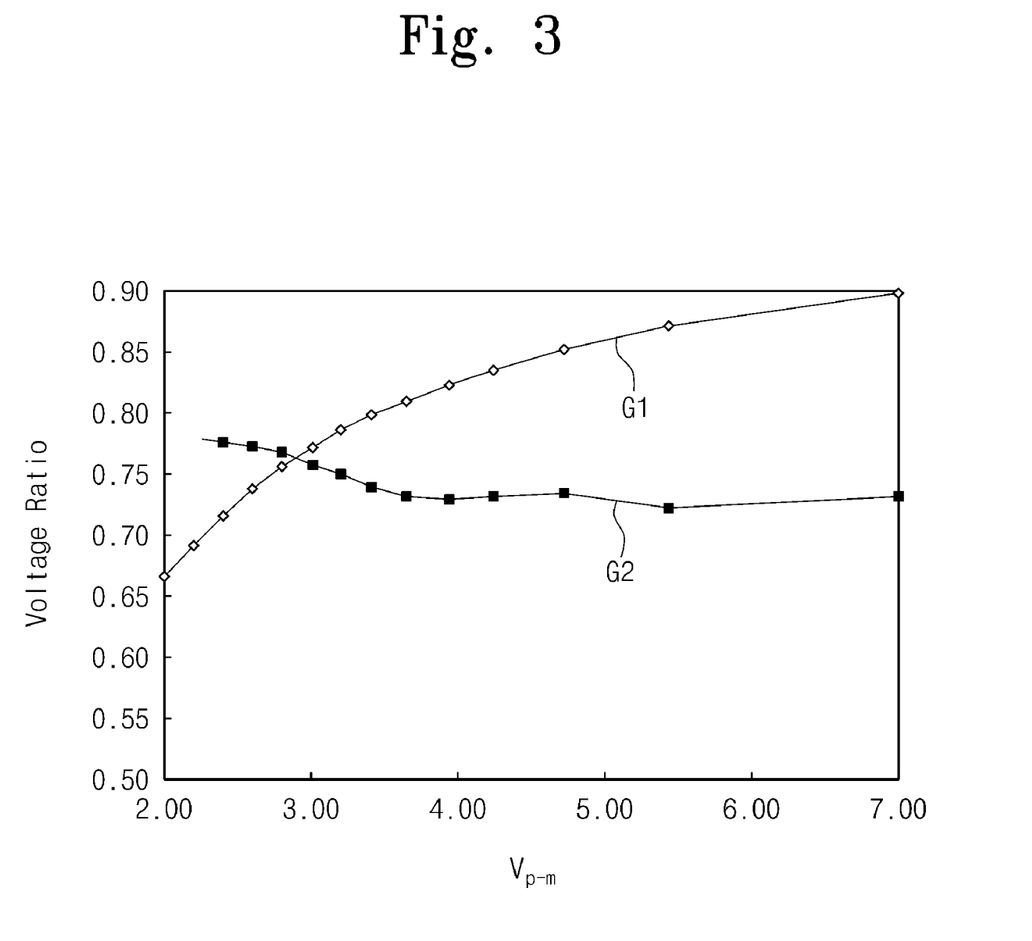
FIG. 3 is a graph showing the voltage ratio between a sub pixel voltage and a main pixel voltage.

FIG. 3 is a graph showing the voltage ratio between a sub pixel voltage and a main pixel voltage. In FIG. 3, the main and sub pixel voltages are measured when the main and sub pixel electrodes have an area ratio of 1:1 and the shifted voltage $V_s$ of the first common voltage $V_{com1}$ is 1.6 volts.

Further, in FIG. 3, a first line G1 represents the voltage ratio of the sub pixel voltage to the main pixel voltage in accordance with the driving method of the present exemplary embodiment, and a second line G2 represents the voltage ratio of the sub pixel voltage to the main pixel voltage in accordance with the conventional CC type driving method, which lowers the sub pixel voltage $V_{p-s}$ to a voltage level lower than the main pixel voltage $V_{p-m}$ using capacitor.

Referring to FIG. 3, as represented by the first line G1, the voltage ratio of the sub pixel voltage $V_{p-s}$ to the main pixel voltage $V_{p-m}$ decreases within a low-medium gray-scale range, and the voltage ratio of the sub pixel voltage $V_{p-s}$ to the main pixel voltage $V_{p-m}$ increases within a high gray-scale range. To the contrary, in accordance with the second line G2, the voltage ratio of the sub pixel voltage $V_{p-s}$ to the main pixel voltage $V_{p-m}$ decreases within the high gray-scale range in comparison to the voltage ratio of the sub pixel voltage $V_{p-s}$ to the main pixel voltage $V_{p-m}$ within the low-medium gray-scale range.

According to the first and second lines G1 and G2, the driving method of the present exemplary embodiment provides a voltage ratio of the sub pixel voltage $V_{p-s}$ to the main pixel voltage $V_{p-m}$ that is lower than that of the conventional CC type driving method within the low-medium gray-scale range, which may improve side viewing visibility as compared to the conventional CC type driving method. Further, the driving method of the present exemplary embodiment provides a voltage ratio of the sub pixel voltage $V_{p-s}$ to the main pixel voltage $V_{p-m}$ that is higher than that of the CC type driving method within the high gray-scale range, which may enhance the brightness as compared to the conventional CC type driving method.

Figure 4:
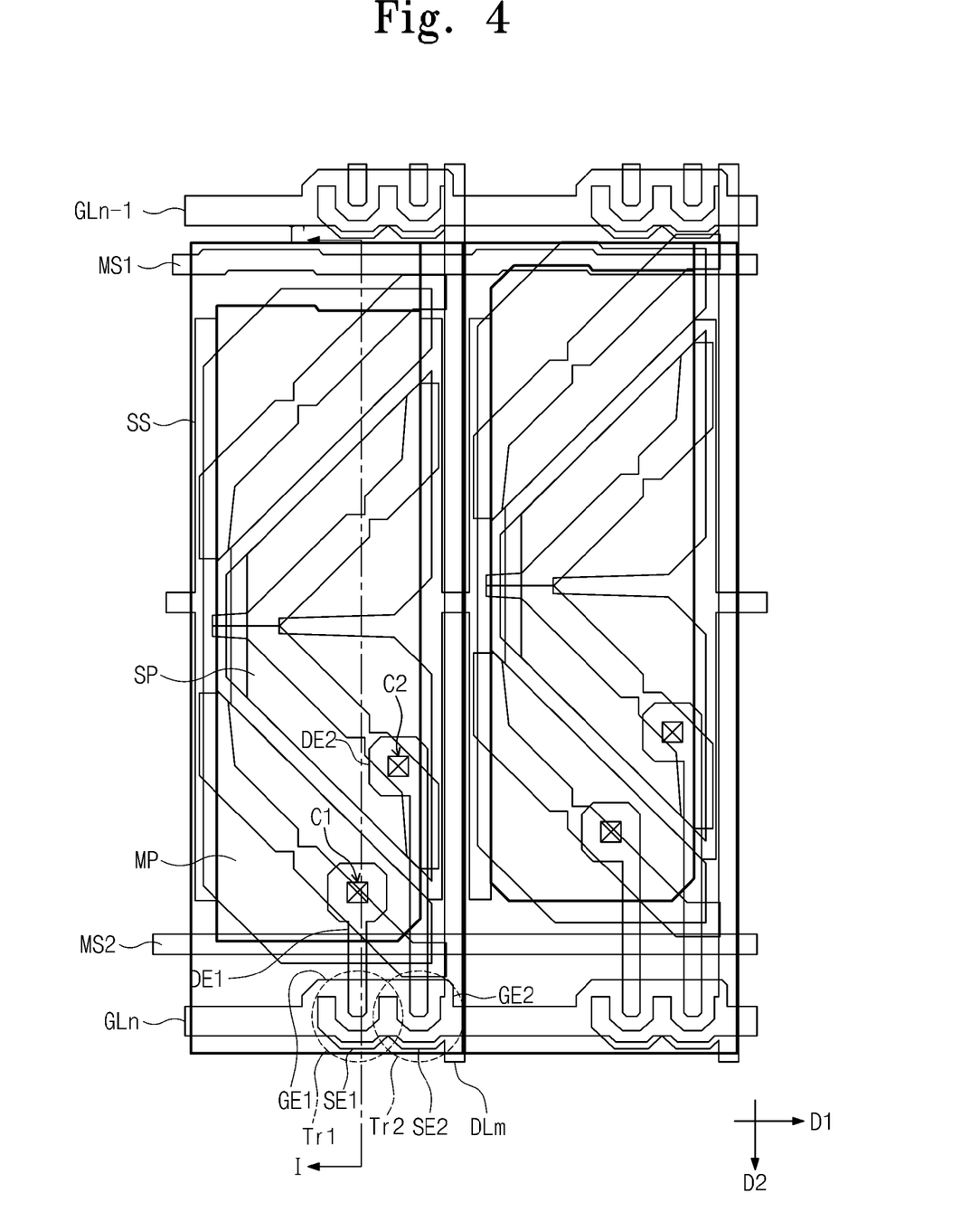
FIG. 4 is a layout diagram of the display panel of FIG. 1.
Figure 5:
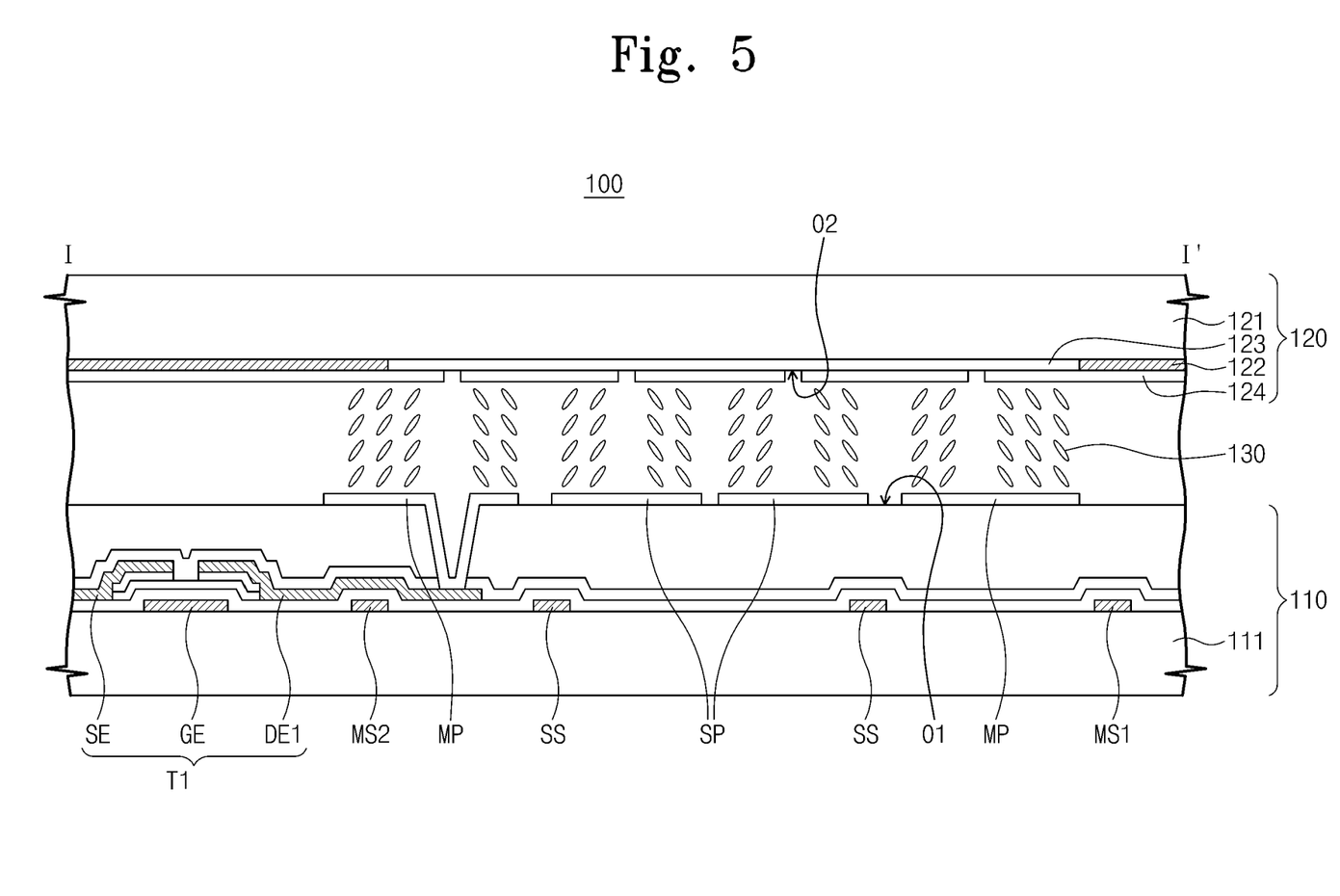
FIG. 5 is a cross-sectional view taken along a line I-I' of FIG. 4.

FIG. 4 is a layout diagram of the display panel of FIG. 1, and FIG. 5 is a cross-sectional view taken along line I-I' of FIG. 4.

Referring to FIG. 4 and FIG. 5, a display panel 100 includes an array substrate 110, an opposite substrate 120 coupled to the array substrate 110 and facing the array substrate 110, and a liquid crystal layer 130 disposed between the array substrate 110 and the opposite substrate 120.

The array substrate 110 includes a first base substrate 111 and a plurality of pixels arranged on the first base substrate 111. Each pixel includes a gate line GL, a data line DL, a first thin film transistor Tr1, a second thin film transistor Tr2, a main pixel, and a sub pixel.

The gate line GL extends in a first direction D1 and the data line DL extends in a second direction D2. The data line DL is arranged substantially perpendicular to the gate line GL and insulated from the gate line GL. Each of the first and second thin film transistors Tr1, Tr2 is connected to the gate line GL and the data line DL. Particularly, the first thin film transistor Tr1 includes a first gate electrode GE1 branched from the gate line GL, a first source electrode SE1, and a first drain electrode DEL connected to the main pixel. The second thin film transistor Tr2 includes a second gate electrode GE2 branched from the gate line GL, a second source electrode SE2 branched from the data line DL, and a second drain electrode DE2 connected to the sub pixel. The first source electrode SE2 is extended from the second source electrode SE1.

The first and second thin film transistors Tr1, Tr2 output the data voltage applied to the data line DL through the first and second drain electrodes DEL and DE2 in response to the gate pulse applied through the gate line GL, respectively. Thus, the main and sub pixels receive the data voltage through the first and second thin film transistors Tr1, Tr2, respectively.

The main pixel includes a main pixel electrode MP and a main storage electrode, and the sub pixel includes a sub pixel electrode SP and a sub storage electrode SS. The main pixel electrode MP is connected to the first drain electrode DEL of the first thin film transistor Tr1 through a first contact hole C1 to receive the data voltage. The sub pixel electrode SP is connected to the second drain electrode DE2 of the second thin film transistor Tr1 through a second contact hole C2 to receive the data voltage.

The main and sub pixel electrodes MP and SP are spaced apart from each other. Thus, the main and sub pixel electrodes MP and SP are connected to each other through the first and second thin film transistors Tr1, Tr2 during the 1 H period where the gate pulse is applied to the gate line GL, however, the main and sub pixel electrodes MP and SP are not connected to each other when the first and second thin film transistors Tr1, Tr2 are turned off after the 1 H period. In the present exemplary embodiment, an area between the main and sub pixel electrodes MP and SP is formed by partially removing the pixel electrode and defined as a first opening O1.

The main storage electrode includes a first main storage electrode MS1 and a second main storage electrode MS2. The first and second main storage electrodes MS1 and MS2 extend in the first direction D1 and are spaced apart from each other by a predetermined distance. The main and sub pixel electrodes MP and SP are disposed between the first and second main storage electrodes MS1 and MS2. The first main storage electrode MS1 overlaps the main pixel electrodes of a first pixel group including even-numbered pixels among pixels corresponding to one row, and the second main storage electrode MS2 overlaps the main pixel electrodes of a second pixel group including odd-numbered pixels among the pixels corresponding to the one row. The first and second main storage electrodes MS1 and MS2 receive the first common voltage $V_{com1}$ (shown in FIG. 2), and the first common voltage $V_{com1}$ applied to the first main storage electrode MS1 has a different polarity than that of the first common voltage $V_{com1}$ applied to the second main storage electrode MS2. The polarity of the first common voltage $V_{com1}$ applied to the first and second main storage electrodes MS1 and MS2 is periodically inverted.

The sub storage electrode SS is disposed between the first and second main storage electrodes MS1 and MS2 and overlaps the sub pixel electrode SP. The sub storage electrode SS receives the second common voltage $V_{com2}$ (shown in FIG. 2) that is uniformly maintained at the reference voltage.

The opposite substrate 120 includes a second base substrate 121, a black matrix 122, a color filter layer 123, and a common electrode 124.

The black matrix 122 includes a light blocking material and is arranged on the second base substrate 121. The black matrix 122 is arranged in a non-effective area of one pixel area to prevent light leakage between the pixels. The color filter layer 123 includes red, green, and blue color pixels and is arranged in an effective area of one pixel area. The common electrode 124 is formed over the black matrix 122 and the color filter layer 123. Then, the common electrode 124 is patterned to form a plurality of second openings O2 there through. The second openings O2 are at positions not corresponding to the first opening O1. Particularly, the first opening O1 is positioned between two adjacent second openings O2.

Due to the first and second openings O1 and O2, domains in which liquid crystal molecules are arranged in different directions are defined in one pixel area. When the liquid crystal molecules are arranged in different directions according to the domains, variations of visibility may be reduced due to compensation effects between the domains, resulting in a display panel having a wide viewing angle.

Figure 6:
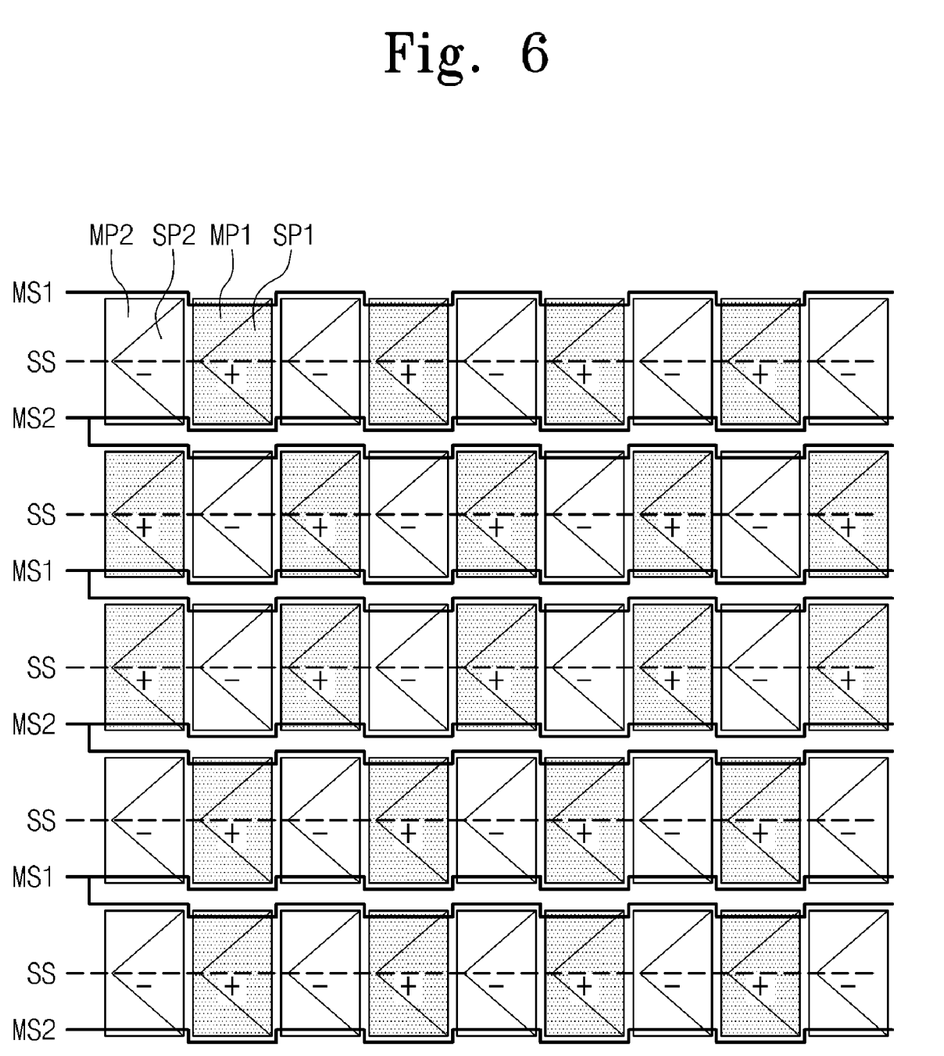
FIG. 6 is a view showing the polarity of a first common voltage against the polarity of a data voltage and connections among a main storage electrode, a sub storage electrode, and the pixels.

FIG. 6 is a view showing the polarity of a first common voltage against the polarity of a data voltage and connections among a main storage electrode, a sub storage electrode, and the pixels.

Referring to FIG. 6, the display panel employs a 2×1 dot-inverting driving method in which the polarity of the data voltage is inverted at every two dots in the column direction and the polarity of the data voltage is inverted at every dot in the row direction. The polarity of the data voltage applied to pixels arranged in one row is inverted at every pixel, so that the first pixel group including the even-numbered pixels of the one row receives the data voltage having different polarity from that of the data voltage applied to the second pixel group including the odd-numbered pixels of the one row. In FIG. 6, the pixels that are hatched constitute the first pixel group and the pixels that are not hatched constitute the second pixel group.

As shown in FIG. 6, during a present frame, the first pixel group receives a data voltage having positive polarity (+) and the second pixel group receives the data voltage having negative polarity (−). During a next frame, the first pixel group receives the data voltage having negative polarity (−) and the second pixel group receives the data voltage having positive polarity (+).

Meanwhile, the first and second main storage electrode MS1 and MS2 are placed adjacent to upper and lower sides of the pixels in the row, respectively. The first main storage electrode MS1 partially overlaps the main pixel electrodes MP1 of the first pixel group, and the second main storage electrode MS2 partially overlaps the main pixel electrodes MP2 of the second pixel group. When a data voltage having positive polarity (+) is applied to the first pixel group, the first common voltage $V_{com1}$ (shown in FIG. 2) is shifted up to the second voltage V2 (shown in FIG. 2) having positive polarity (+) with respect to the reference voltage $V_r$ (shown in FIG. 2) and is applied to the first main storage electrode MS1. Also, when a data voltage having negative polarity (−) is applied to the second pixel group, the first common voltage $V_{com1}$ is shifted down to the first voltage V1 having negative polarity (−) with respect to the reference voltage $V_r$ and is applied to the second main storage electrode MS2.

Further, the first main storage electrode MS1 partially overlaps the main pixel electrodes of the second pixel group of the pixels in an adjacent row, and the second main storage electrode MS2 partially overlaps the main pixel electrodes of the first pixel group of the pixels in the adjacent row.

The sub storage electrode SS partially overlaps the sub pixel electrodes SP1 and SP2 of the pixels arranged in one row. The sub storage electrode SS receives the second common voltage $V_{com2}$ that is uniformly maintained at the reference voltage $V_r$.

Thus, the main pixel electrodes MP1 of the first pixel group receive the main pixel voltage raised by the shifted-up voltage due to the first common voltage $V_{com1}$ that is shifted up, and the main pixel electrodes MP2 of the second pixel group receive the main pixel voltage lowered by the shifted-down voltage due to the first common voltage $V_{com2}$ that is shifted down. Thus, the main pixel voltage may have a larger absolute value than that of the sub pixel voltage applied to the sub pixel electrode, and may be applied to the main pixel electrode of each pixel.

As described above, the main and sub pixel electrodes receive different pixel voltages from each other by raising the absolute value of the main pixel voltage, which may improve side viewing visibility and enhance brightness.

Figure 7A:
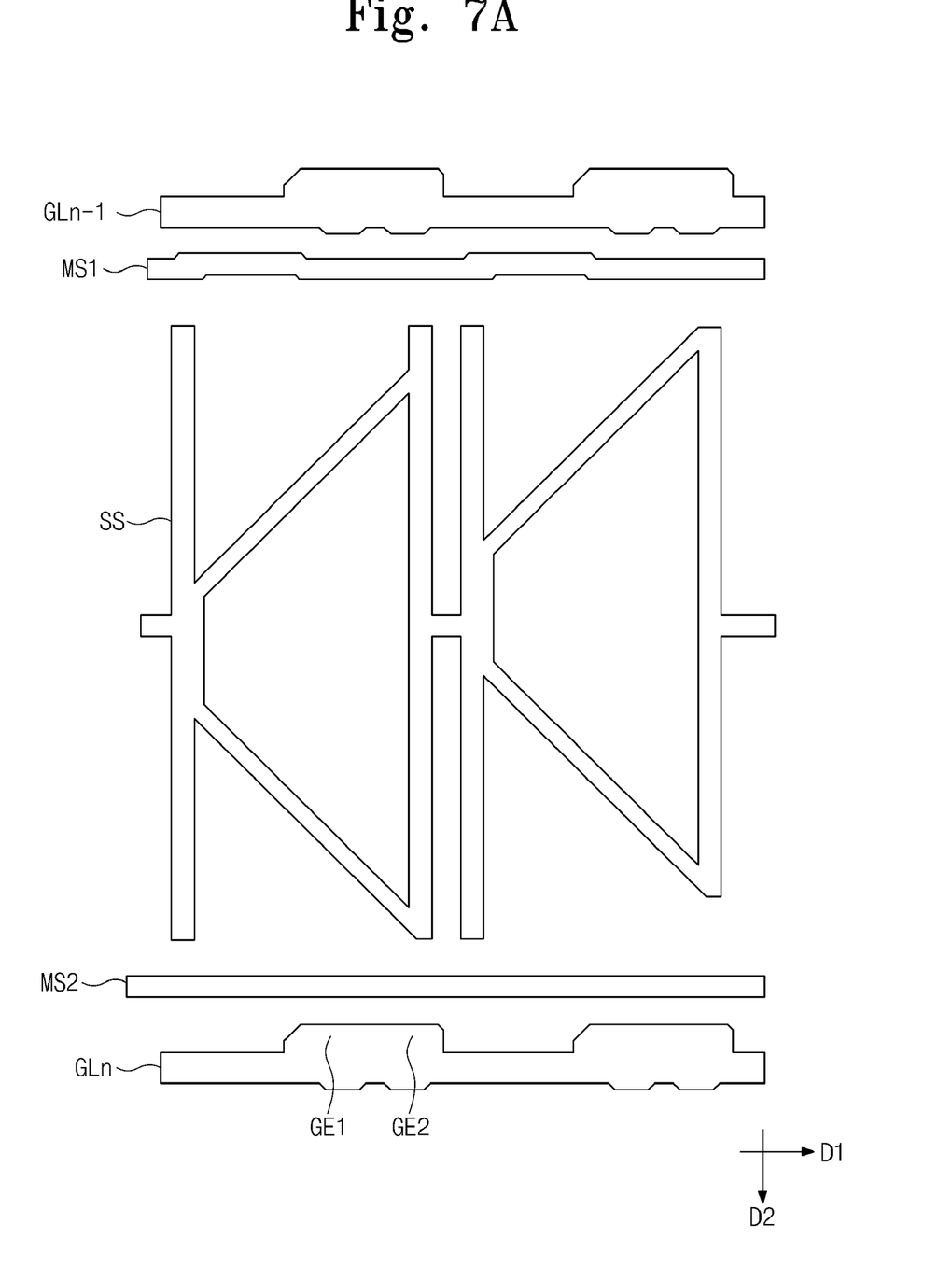
FIG. 7A, FIG. 7B, and FIG. 7C are plan views showing a manufacturing process of an array substrate of FIG. 4.
Figure 7B:
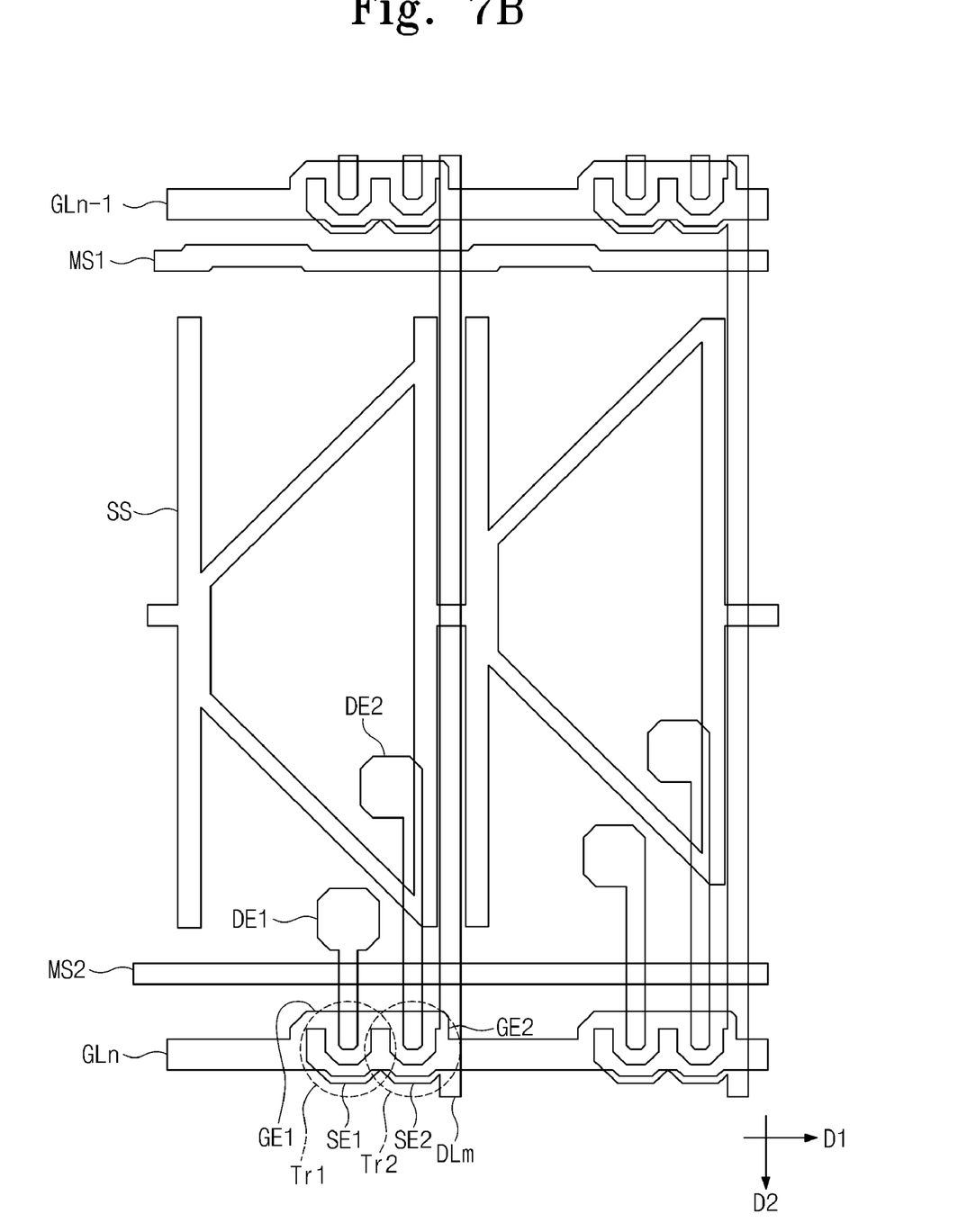
Figure 7C:
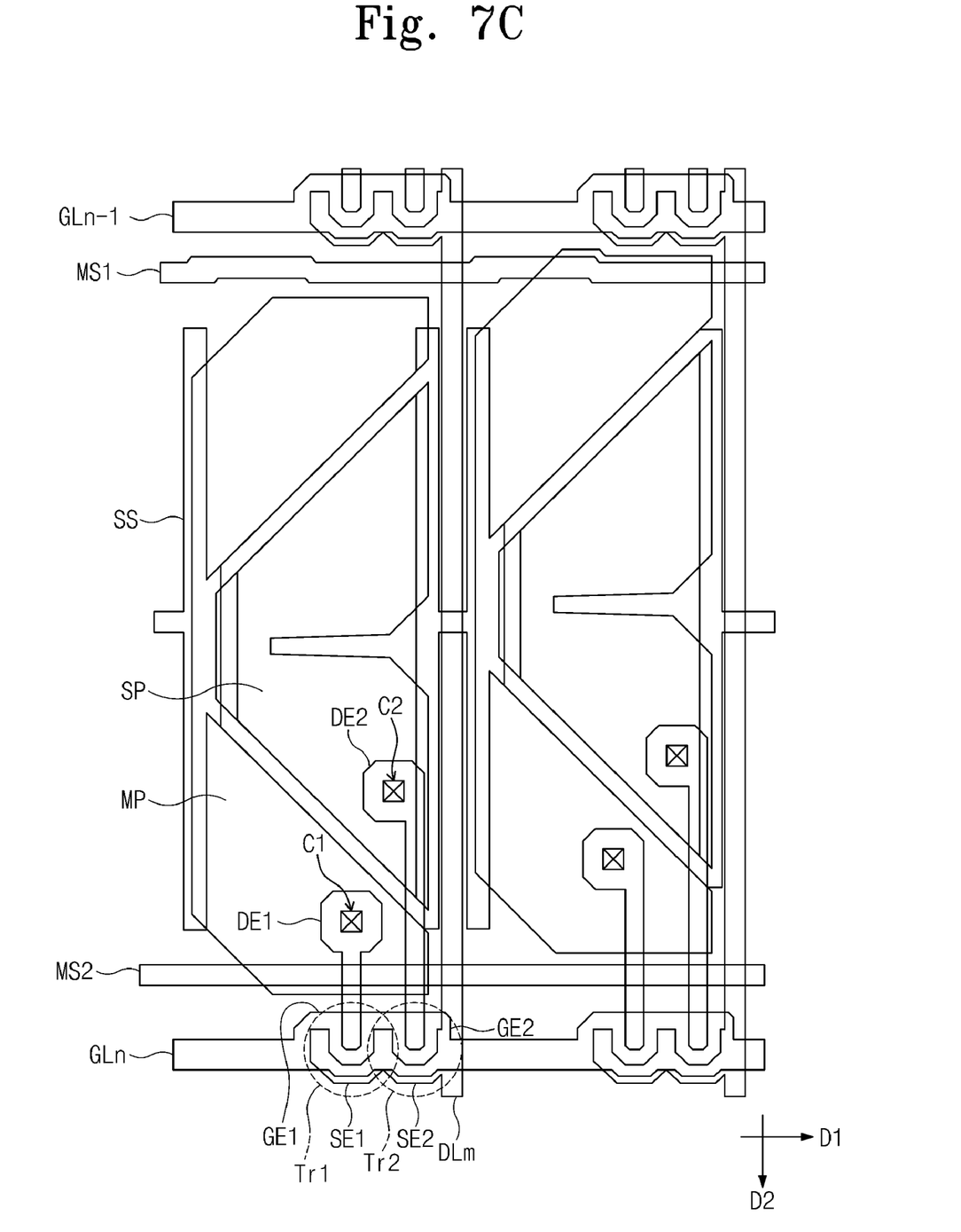

FIG. 7A, FIG. 7B, and FIG. 7C are plan views showing a process of manufacturing the array substrate of FIG. 4.

Referring to FIG. 7A, a gate metal layer is formed on the first base substrate 111. When the gate metal layer is patterned, the gate line $GL_n$, the first and second gate electrodes GE1, GE2, the sub storage electrode SS, the first main storage electrode MS1, and the second main storage electrode MS2 are formed on the first base substrate 111.

The gate line $GL_n$ extends in the first direction D1 and the first and second gate electrodes GE1, GE2 are branched from the gate line $GL_n$. The first and second main storage electrodes MS1 and MS2 extend in the first direction D1 and are spaced apart from each other. As shown in FIG. 7A, the first main storage electrode MS1 is placed adjacent to a previous gate line $GL_{n-1}$, and the second main storage electrode MS2 is placed adjacent to the gate line $GL_n$. The sub storage electrode SS is formed between the first and second main storage electrodes MS1 and MS2.

Then, a gate insulating layer (not shown) is formed on the first base substrate 111 to cover the gate line $GL_n$, the first and second gate electrodes GE1, GE2, the sub storage electrode SS, the first main storage electrode MS1, and the second main storage electrode MS2.

Referring to FIG. 7B, a data metal layer is formed on the gate insulating layer. When the data metal layer is patterned, the data line $DL_m$, the first source electrode SE1, the second source electrode SE2, the first drain electrode DE1, and the second drain electrode DE2 are formed on the gate insulating layer.

The data line $DL_m$ extends in the second direction D2, substantially perpendicular to the first direction D1. The data line $DL_m$ is insulated from and crosses the gate line $GL_n$. The second source electrode SE2 is branched from the data line $DL_m$, and the first source electrode SE1 is extended from the second source electrode SE2. The first and second drain electrodes DEL and DE2 are spaced apart from the first and second source electrode SE1, SE2, respectively. Thus, the first and second thin film transistors Tr1, Tr2 are completed on the first base substrate 111.

Then, a protective layer (not shown) and an organic insulating layer (not shown) are sequentially formed on the first base substrate 111 to cover the data line $DL_m$, the first source electrode SE1, the second source electrode SE2, the first drain electrode DEL, and the second drain electrode DE2. The protective layer and the organic insulating layer are partially removed to provide the first and second contact holes C1 and C2 formed there through, thereby exposing the first and second drain electrodes DE1 and DE2, respectively.

Referring to FIG. 7C, a transparent conductive layer, such as indium tin oxide (ITO) or indium zinc oxide (IZO), is formed on the organic insulating layer. When the transparent conductive layer is patterned, the main and sub pixel electrodes MP and SP are formed on the organic insulating layer. The main and sub pixel electrodes MP and SP are spaced apart from each other and are not connected to each other. The main pixel electrode MP is connected to the first drain electrode DE1 through the first contact hole C1, and the sub pixel electrode SP is connected to the second drain electrode DE2 through the second contact hole C2. Thus, when the first and second thin film transistors Tr1, Tr2 are turned on, the main and sub pixel electrodes MP and SP may be connected to each other through the first and second thin film transistors Tr1, Tr2.

The main pixel electrodes of the first pixel group, including the even-numbered pixels of the pixels arranged in one row, partially overlap the first main storage electrode MS1, and the main pixel electrodes of the second pixel group, including the odd-numbered pixels of the pixels arranged in one row, partially overlap the second main storage electrode MS2. Further, the sub pixel electrode SP partially overlaps the sub storage electrode SS, completing the array substrate 110.

Figure 8:
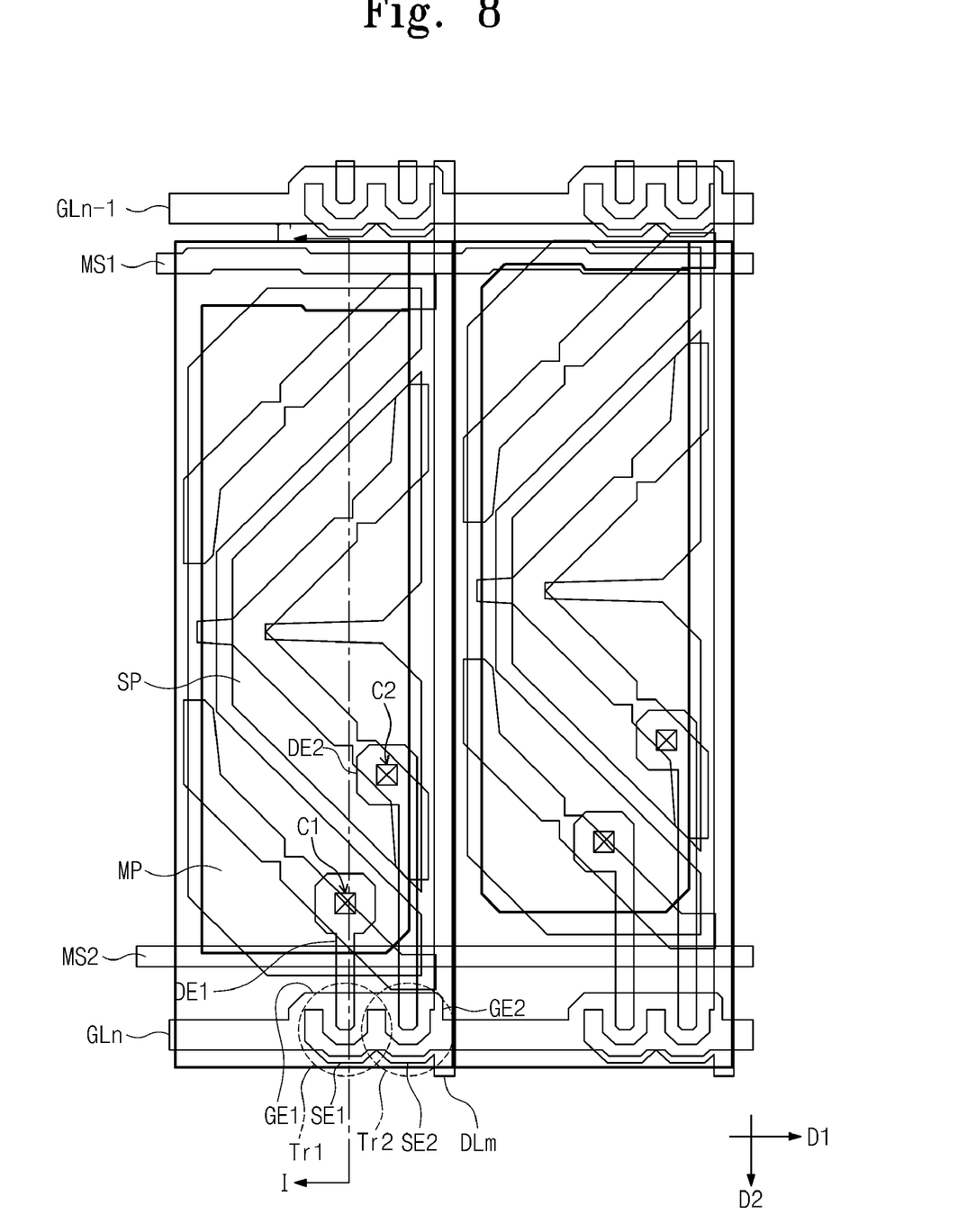
FIG. 8 is a layout diagram of a display panel according to an another exemplary embodiment of the present invention.

FIG. 8 is a layout diagram of a display panel according to another exemplary embodiment of the present invention. In FIG. 8, the same reference numerals denote the same or similar elements in FIG. 4, and thus the detailed descriptions of the same elements will be omitted.

Referring to FIG. 8, an array substrate of display panel according to another exemplary embodiment of the present invention includes a plurality of pixels each which includes a gate line GL, a data line DL, a first thin film transistor Tr1, a second thin film transistor Tr2, a main pixel electrode MP, a sub pixel electrode SP, and a main storage electrode. Also the main storage electrode includes a first main storage electrode MS1 and a second main storage electrode MS2. In FIG. 8, a sub storage electrode SS (refer to FIG. 4) is removed in the each pixel. Thus, the display panel has a sub Cst-less structure.

The first and second thin film transistors Tr1, Tr2 output the data voltage applied to the data line DL through the first and second drain electrodes DE1 and DE2 in response to the gate pulse applied through the gate line GL, respectively. Thus, the main and sub pixel electrode MP, SP receive the data voltage through the first and second thin film transistors Tr1, Tr2, respectively.

The main and sub pixel electrodes MP and SP are spaced apart from each other. Thus, the main and sub pixel electrodes MP and SP are connected to each other through the first and second thin film transistors Tr1, Tr2 during the 1 H period where the gate pulse is applied to the gate line GL, however, the main and sub pixel electrodes MP and SP are not connected to each other when the first and second thin film transistors Tr1, Tr2 are turned off after the 1 H period.

The first and second main storage electrodes MS1 and MS2 extend in the first direction D1 and are spaced apart from each other by a predetermined distance. The main and sub pixel electrodes MP and SP are disposed between the first and second main storage electrodes MS1 and MS2. The first main storage electrode MS1 overlaps the main pixel electrodes of a first pixel group including even-numbered pixels among pixels corresponding to one row, and the second main storage electrode MS2 overlaps the main pixel electrodes of a second pixel group including odd-numbered pixels among the pixels corresponding to the one row. The first and second main storage electrodes MS1 and MS2 receive the first common voltage $V_{com1}$ (shown in FIG. 2), and the first common voltage $V_{com1}$ applied to the first main storage electrode MS1 has a different polarity than that of the first common voltage $V_{com1}$ applied to the second main storage electrode MS2. The polarity of the first common voltage $V_{com1}$ applied to the first and second main storage electrodes MS1 and MS2 is periodically inverted.

The main pixel electrode MP receives the data voltage from the first thin film transistor Tr1 during the 1 H period and then its voltage is changed into a main pixel voltage different from the data voltage in response to a variation of the first common voltage applied to the first main storage electrode MS1. The sub pixel electrode SP receives the data voltage from the second thin film transistor Tr2 during the 1 H period and then its voltage is maintained as a sub pixel voltage until it receives the next data voltage from the second thin film transistor Tr2.

According to the display panel, the voltage level of the first common voltage applied to the main storage electrode may vary with the gate pulse and the polarity of the data voltage and the main pixel voltage may be shifted up or down based on the first common voltage.

Thus, the main pixel voltage may have a different voltage level from that of the sub pixel voltage, which may improve side viewing visibility. Also, since the main pixel voltage may have an absolute value greater than that of the sub pixel voltage, the brightness of the display panel may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display panel, comprising:
    a plurality of pixels, each pixel comprising:
        a gate line to receive a gate pulse that is maintained at a gate-on voltage during one horizontal scanning period (a 1 H period);
        a data line insulated from and crossing the gate line to receive a data voltage;
        a main storage electrode to receive a first common voltage, the first common voltage varying with the gate pulse and the polarity of the data voltage;
        a sub storage electrode to receive a second common voltage that is maintained at a constant voltage level;
        a main pixel electrode capacitively coupled to the main storage electrode;
        a sub pixel electrode capacitively coupled to the sub storage electrode;
        a first thin film transistor connected to the gate line, the data line, and the main pixel electrode; and
        a second thin film transistor connected to the gate line, the data line, and the sub pixel electrode;
    wherein the main pixel electrode receives the data voltage from the first thin film transistor during the 1 H period and then its voltage is changed into a main pixel voltage different from the data voltage in response to a variation of the first common voltage, and
    the sub pixel electrode receives the data voltage from the second thin film transistor during the 1 H period and then its voltage is maintained as a sub pixel voltage until it receives the next data voltage from the second thin film transistor.

2. The display panel of claim 1, wherein the first common voltage has a period corresponding to two frames and swings between a first voltage that is lower than a reference voltage and a second voltage that is higher than the reference voltage, and the second common voltage has a voltage level that is the same as that of the reference voltage.

3. The display panel of claim 2, wherein the first common voltage is raised or lowered at a time between a first time when the gate pulse is lowered from the gate-on voltage to a gate-off voltage and a second time that is later than the first time by one frame.

4. The display panel of claim 2, wherein the first common voltage is raised from the first voltage to the second voltage after the data voltage has changed from a negative polarity to a positive polarity with respect to the second common voltage, and the first common voltage is lowered from the second voltage to the first voltage after the data voltage has changed from a positive polarity to a negative polarity with respect to the second common voltage.

5. The display panel of claim 1, wherein the amount by which the first common voltage changes is in the range of about 1 volt to about 2 volts.

6. The display panel of claim 1, wherein the main pixel electrode and the sub pixel electrode have an area ratio in the range of 1:1 to 1:2.

7. The display panel of claim 1, wherein the pixels are arranged in a matrix configuration and are classified into a first polarity pixel and a second polarity pixel, and the main storage electrodes extend in a row direction and are classified into a first polarity storage electrodes and a second polarity storage electrodes, the first polarity storage electrode overlapping the first polarity pixel electrode and the second polarity storage electrode overlapping the second polarity pixel electrode.

8. The display panel of claim 7, wherein the polarity of the pixels is inverted at every two pixels in the column direction, at every pixel in the row direction, and at every frame.

9. A display panel, comprising:
    a plurality of pixels, each pixel comprising:
        a gate line to receive a gate pulse that is maintained at a gate-on voltage during one horizontal scanning period (a 1 H period);
        a data line insulated from and crossing the gate line to receive a data voltage;
        a main storage electrode to receive a common voltage, the common voltage varying with the gate pulse and the polarity of the data voltage;
        a main pixel electrode capacitively coupled to the main storage electrode;
        a sub pixel electrode;
        a first thin film transistor connected to the gate line, the data line, and the main pixel electrode; and
        a second thin film transistor connected to the gate line, the data line, and the sub pixel electrode;
    wherein the main pixel electrode receives the data voltage from the first thin film transistor during the 1 H period and then its voltage is changed into a main pixel voltage different from the data voltage in response to a variation of the common voltage,
    the sub pixel electrode receives the data voltage from the second thin film transistor during the 1 H period and then its voltage is maintained as a sub pixel voltage until it receives the next data voltage from the second thin film transistor, and
    the common voltage has a period corresponding to two frames and swings between a first voltage that is lower than a predetermined reference voltage and a second voltage that is higher than the reference voltage.

10. The display panel of claim 9, wherein the common voltage is raised or lowered at a time between a first time when the gate pulse is lowered from the gate-on voltage to a gate-off voltage and a second time that is later than the first time by one frame.

11. The display panel of claim 9, wherein the common voltage is raised from the first voltage to the second voltage after the data voltage has changed from a negative polarity to a positive polarity with respect to the reference voltage, and the common voltage is lowered from the second voltage to the first voltage after the data voltage has changed from a positive polarity to a negative polarity with respect to the reference voltage.

12. The display panel of claim 9, wherein the amount by which the common voltage changes is in the range of about 1 volt to about 2 volts.

13. The display panel of claim 9, wherein the main pixel electrode and the sub pixel electrode have an area ratio in the range of 1:1 to 1:2.

14. The display panel of claim 9, wherein the pixels are arranged in a matrix configuration and are classified into first polarity pixels and second polarity pixels, and the main storage electrodes extend in a row direction and are classified into first polarity storage electrodes and second polarity storage electrodes, the first polarity storage electrodes overlapping the first polarity pixel electrodes and the second polarity storage electrodes overlapping the second polarity pixel electrodes.

15. A method of driving a display panel, comprising:

applying a data voltage to a main pixel electrode from a first thin film transistor during a 1 H period;

changing the voltage of the main pixel electrode to a main pixel voltage different from the data voltage in response to a variation of a common voltage;

applying the data voltage to a sub pixel electrode from a second thin film transistor during the 1 H period; and maintaining the voltage of the sub pixel electrode until it receives a next data voltage from the second thin film transistor, wherein the common voltage varies with a gate pulse and a polarity of the data voltage.

16. The driving method of claim 15, wherein the common voltage has a period corresponding to two frames and swings between a first voltage that is lower than a predetermined reference voltage and a second voltage that is higher than the reference voltage.

* * * * *